United States Patent [19]
Desai et al.

[11] Patent Number: 5,812,767
[45] Date of Patent: Sep. 22, 1998

[54] SYSTEM FOR USER REGISTERING AN ADDRESS RESOLUTION ROUTINE TO PROVIDE ADDRESS RESOLUTION PROCEDURE WHICH IS USED BY DATA LINK PROVIDER INTERFACE FOR RESOLVING ADDRESS CONFLICTS

[75] Inventors: Saurabh Desai, Round Rock; Jessie Ann Hays Haug; Gregory Scott Joyce, both of Austin; Lance Warren Russell, Fredericksburg; Larry Steven Wise, Austin, all of Tex.

[73] Assignee: International Business Machines Corporation, Armonk, N.Y.

[21] Appl. No.: 815,757

[22] Filed: Mar. 12, 1997

Related U.S. Application Data

[63] Continuation of Ser. No. 508,494, Jul. 28, 1995, abandoned.

[51] Int. Cl.$^6$ ........................................... G06F 13/00
[52] U.S. Cl. ................... 395/200.8; 395/200.75; 395/823
[58] Field of Search .................................. 395/275, 280, 395/500, 682

[56] References Cited

U.S. PATENT DOCUMENTS

| | | | |
|---|---|---|---|
| 4,542,497 | 9/1985 | Huang et al. ............................... | 370/60 |
| 4,703,477 | 10/1987 | Adelmann et al. ....................... | 370/94 |
| 4,794,589 | 12/1988 | Finch et al. ................................ | 370/60 |
| 4,972,470 | 11/1990 | Farago ........................................ | 380/3 |
| 5,020,055 | 5/1991 | May, Jr. ................................... | 370/94.1 |
| 5,062,106 | 10/1991 | Yamazaki et al. ...................... | 370/94.1 |
| 5,099,517 | 3/1992 | Gupta et al. .............................. | 380/29 |
| 5,121,482 | 6/1992 | Patton ....................................... | 395/275 |
| 5,133,053 | 7/1992 | Johson et al. ............................ | 395/200 |
| 5,214,646 | 5/1993 | Yacoby ................................. | 370/85.14 |
| 5,251,205 | 10/1993 | Callon et al. ............................... | 370/60 |
| 5,265,239 | 11/1993 | Ardolino .................................. | 395/500 |
| 5,386,515 | 1/1995 | Martin et al. ............................. | 395/275 |
| 5,485,460 | 1/1996 | Schrier et al. .......................... | 370/94.1 |
| 5,548,731 | 8/1996 | Chang et al. ............................. | 395/280 |
| 5,606,702 | 2/1997 | Diel et al. ................................ | 395/682 |
| 5,613,096 | 3/1997 | Danknick ................................. | 395/500 |

*Primary Examiner*—Thomas C. Lee
*Assistant Examiner*—David Ton
*Attorney, Agent, or Firm*—Jenkens & Gilchrist; George E. Clark; Richard A. Henkler

[57] ABSTRACT

An information handling system includes a number of stations connected in a network configuration, each station including a processor, a storage and an I/O controller, where the processor operates under control of an operating system control program which is divided into a user (application) space and a kernel (system) space, the kernel may include a protocol layer interfacing the user application to a DLPI in the kernel, a DLPI which interfaces between the protocol module and a device driver interface, a device driver and a hardware device for connecting the station to the network. When data is to be received by a station from the network, the following steps are performed in the DLPI: recognize the network interface type (FDDI, Ethernet, Token Ring, etc.); recognize the protocol being used; format data according to the protocol; transmit to a Data Link Services user if address resolution is not required; if address resolution is required, test to determine if the protocol address resolution routine is registered; if registered, transmit data to the Data Link Services user; if not registered, call the default address resolution routine to resolve address and then transmit data to protocol module. When data is to be transmitted from a station to the network, the following steps are performed in the DLPI: recognize the network interface type (FDDI, Ethernet, Token Ring, etc.); recognize the protocol being used; test for registered address resolution routine; if not registered, call the default address resolution routine; if registered, call the registered address resolution routine; and call the device driver to, output the data to be transmitted to the network.

9 Claims, 4 Drawing Sheets

SYSTEM FOR USER REGISTERING AN ADDRESS RESOLUTION ROUTINE TO PROVIDE ADDRESS RESOLUTION PROCEDURE WHICH IS USED BY DATA LINK PROVIDER INTERFACE FOR RESOLVING ADDRESS CONFLICTS

This application is a continuation of application Ser. No. 08/508,494, filed on Jul. 28, 1995, which was abandoned upon the filing hereof.

BACKGROUND OF THE INVENTION

1. Field of the Invention

The present invention relates to information handling systems, and more particularly to information systems including networked stations each having a data link provider interface.

2. Prior Art

Prior art data link provider interface (DLPI) drivers were designed to operate with a single network interface, such as, token ring, FDDI, ethernet, etc. This limited flexibility and required that the interface drivers be modified for each different protocol with which the DLPI operated.

SUMMARY OF THE INVENTION

Therefore, it is a primary object of the present invention to operate a network connected DLPI with a ubiquitous driver capable of interfacing with a number of different protocols.

Accordingly, an information handling system includes a number of stations connected in a network configuration, each station including a processor, a storage and an I/O controller, where the processor operates under control of an operating system control program which is divided into a user (application) space and a kernel (system) space, the kernel may include a protocol layer interfacing the user application to a DLPI in the kernel, a DLPI which interfaces between the protocol module and a device driver interface, a device driver and a hardware device for connecting the station to the network. When data is to be received by a station from the network, the following steps are performed in the DLPI: recognize the network interface type (FDDI, Ethernet, Token Ring, etc.); recognize the protocol being used; format data according to the protocol; transmit to protocol module if address resolution is not required; if address resolution is required, test to determine if the protocol address resolution routine is registered; if registered, transmit data to protocol module; if not registered, call the default address resolution routine to resolve address and then transmit data to protocol module. When data is to be transmitted from a station to the network, the following steps are performed in the DLPI: recognize the network interface type (FDDI, Ethernet, Token Ring, etc.); recognize the protocol being used; test to determine if data is in a registered format; if not, call the default format routine, if yes, test for registered address resolution routine; if not registered, call the default address resolution routine; if registered, call the registered address resolution routine; and call the device driver to output the data to be transmitted to the network.

It is an advantage of the present invention that a network connected station can communicate with many different communications protocols without modification of DLPI code.

DETAILED DESCRIPTION OF A PREFERRED EMBODIMENT OF THE INVENTION

Figure 1:
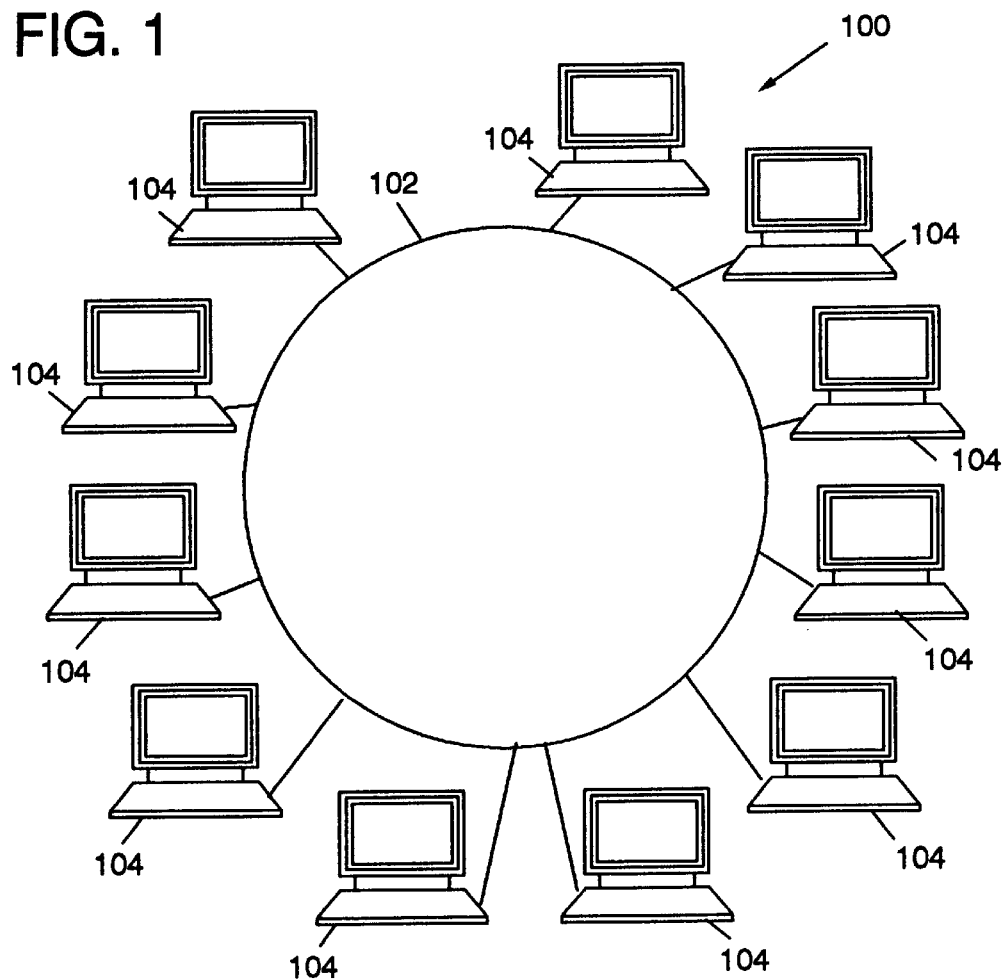
FIG. 1 is a block diagram of a communications network embodying the present invention.

Referring now to FIG. 1, a communications network embodying the present invention will be described.

An information handling system 100 includes a communications network 102 having a number of user stations 104 connected to network 102 for transmitting and receiving information between stations 104.

Network 102 may be implemented by any well known network technology, from an ethernet LAN (local area network) to the Internet.

Figure 2:
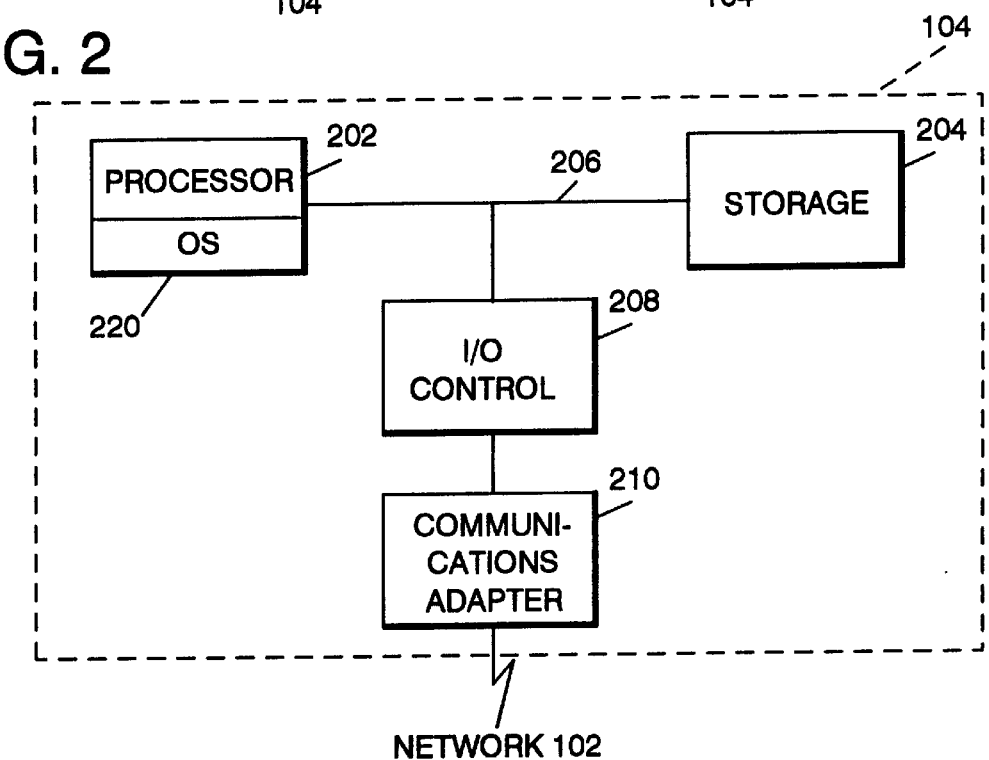
FIG. 2 is a block diagram of major elements of a network connected station of FIG. 1.

Referring now to FIG. 2, stations 104 will be further described.

Each station 104 includes a processor 202, a storage 204, an I/O controller 208, and one or more communications adapters 210. An internal bus 206 connects the processor 202, the storage 204 and an I/O controller 208, to communicate instructions, addresses and data between the processor 202, the storage 204 and the I/O controller 208. I/O controller 208 is connected to the one or more communications adapters 210, each of which is connected to network 102. Each of the elements of station 104 referenced with respect to FIG. 2 is well known in the art and may be readily implemented by a number of commercially available devices. The operating system 300 is stored in an internal storage 220 in processor 202 during execution.

Figure 3:
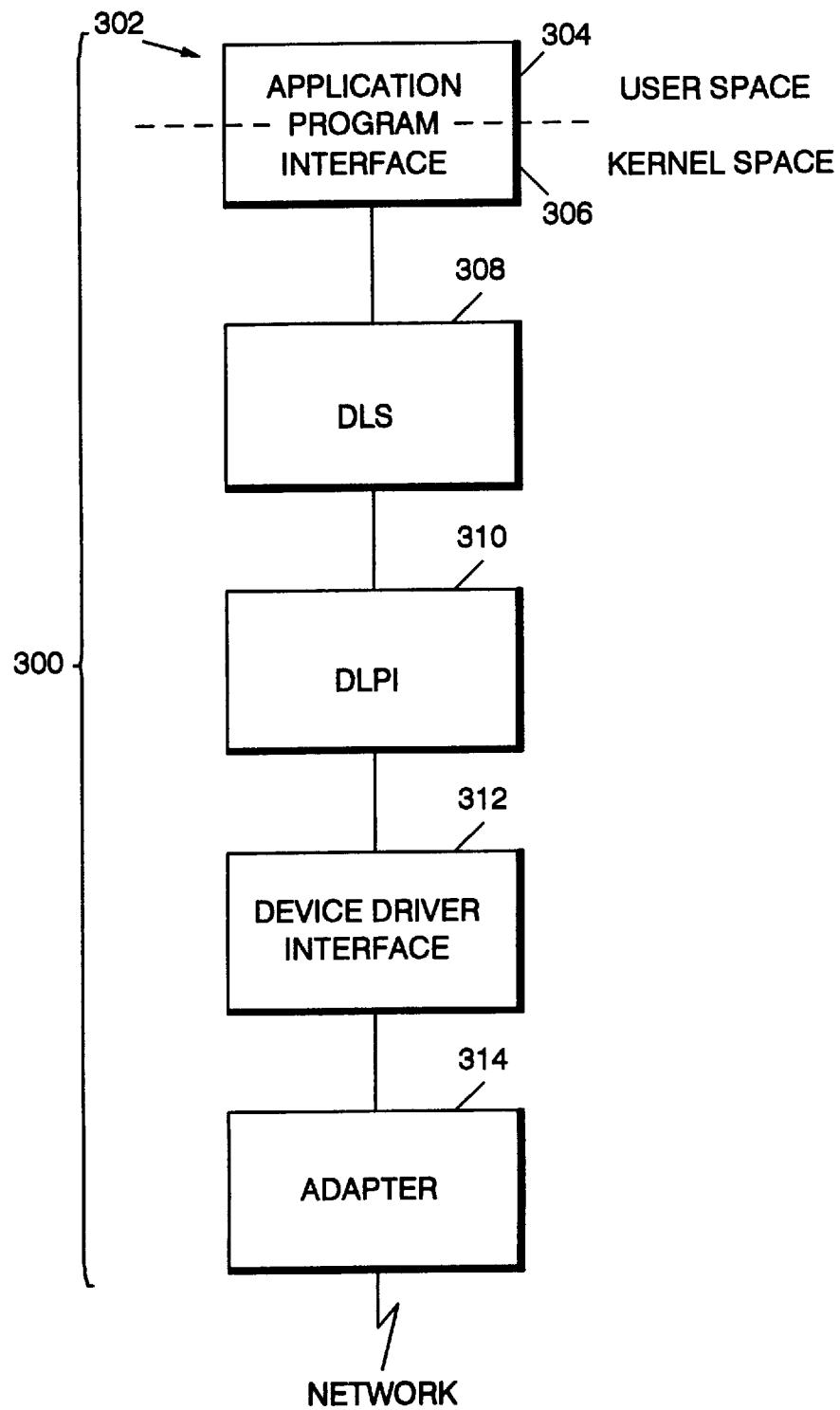
FIG. 3 is a block diagram of interconnection of components of control software according to the present invention.

Referring now to FIG. 3, the operating system 300 controlling station 104 will be further described.

Application program interface 302 interfaces the user space libraries 304 and the streams kernel framework space 306. User space 304 is under control of user application programs and the kernel space is under the control of operating system 300. A Data Link Services Unit (DLS) 308 interfaces the protocols used in application program interface 302 and the DLPI 310. DLPI 310 is the interface between the DLS 308 and the device driver interface 312. Device driver interface 312 drives the physical adapter 314.

The DLPI 310 will now be described in greater detail. DLPI 310 supports Common Data Link Interface (CDLI) based network interfaces in a generic manner. This support is enabled by allowing the DLS 308 to specify the particular packet format necessary for the transmission medium over which the stream is created. Using an I/O Control (IOCTL) streams message, the DLS 308 can specify the packet format. A helpers structure and an output bundle structure is defined as follows:

```
struct helpers {
        int                       pkt_format;
        ushort                    ethertype;
        union {
                struct ie2_11c_hdr        11c;
```

-continued

```
        struct 1e2__11c__snaphdr    11csnap;
    } sapu;
    caddr_t                         segp;
    ulong                           seglen;
};
struct output_bundle {
    caddr_t        key_to_find;    /*Usually the destination hwaddr*/
    struct helpers helpers;         /*Hints like sap, snap type, etc.*/
```

If no format is specified, a default format PROTO is used. The packet formats are defined in an 'include' file with the following format definitions:

PROTO DLS does not supply link level headers, DLPI fills in the link level headers, SNAP is not used. SNAP is an acronym for Sub-Network Access Protocol.

PROTO SNAP DLS does not supply link level headers, DLPI fills in the link level headers, including SNAP.

INCLUDE LLC DLS supplies LLC header. DLPI fills in the MAC header.

INCLUDE MAC DLS supplies all headers.

The DLS 308 is allowed one packet format specification per stream. This packet format should be specified after 'attach' and before 'bind' to avoid errors.

The DLS 308 communicates with the DLPI 310 via primitive commands defined in the UNIX International specifications OSI Work Group Version 2. For a primitive command identified as DL_UNITDATA_IND, the DLPI 310 will provide header information in the dl_unitdata_ind_t structure. If the packet format specified is PROTO or PROTO_,SNAP, the MAC (machine access control) and LLC (Logical level control) (See IEEE Standard 802.2 Information Processing Systems-LAN Part 2 Logical level controls, which is incorporated by reference herein) are included in the DLPI header, and the data portions of the message will contain only data. If the packet format is PROTO, the DLPI header includes the MAC and LLC without the SNAP. If the packet format is PROTO_SNAP, the DLPI header includes the MAC, LLC, and SNAP. If the packet format specified is INCLUDE_LLC or INCLUDE_MAC, the DLPI header will contain only the destination and source addresses. If the packet format is INCLUDE_LLC, only the LLC will be placed in the data portion of the message. If the packet format is INCLUDE_MAC, the MAC and LLC are both placed in the data portion of the message. Thus, the DLS 308 must have knowledge of the MAC header and LLC architecture for that interface in order to retrieve the MAC header and LLC from the data portion of the message.

For the DL_UNITDATAKREQ primitive, if the DLS 308 had specified either the PROTO, PROTO_SNAP or INCLUDE_LLC formats, the DLS 308 must provide the destination address and an optional DSAP (Destination Service Access Pointer) in the DLPI header. If the DLS 308 does not specify the DSAP, the DSAP specified at bind time will be used. If the DLS 308 specifies the INCLUDE_LLC packet format, the DLS 308 must include only the LLC in the data portion. If the DLS 308 specifies the INCLUDE_MAC packet format, the DLS 308 must provide full MAC header including the LLC in the data portion of the message.

The DLS user specifies the packet format via the STREAMS I_STR IOCTL system call.

The following is a sample routine to specify packet format:

```
#include < sys/stropts.h >
#include < sys/dlpistats.h >
int fd, pkt_format;
struct strioctl strioctl;
if ((fd = open("/dev/dlpi/en", 2)) < 0)
        perror("open");
pkt_format = NS_INCLUDE_MAC;
strioctl.ic_dp = (char *)&pkt_format;
strioctl.ic_cmd = DL_PKT_FORMAT;
strioctl.ic_timeout = 0;
strioctl.ic_len = sizeof(long);
if (ioctl(fd,I_STR,&strioctl) < 0) {
        perror("ioctl I_STR failed");
        exit(1);
}
```

Address Resolution

The CLDI has been improved to allow users to configure a network demultiplexer to use specific address routines. This capability improves the performance of the DLPI.

The CLDI network services keeps track of the MAC level routing information. When a packet comes into the network services demultiplexer, the demultiplexer address resolution routine stores the routing information for token ring and FDDI. Address resolution routines are operating system kernel extensions and are registered with the demultiplexer. Thus, users can supply their own address resolution routines without changes to the operating system.

In order for the DLPI 310 to generically support all interface types, the DLPI has been implemented to allow the DLS 308 the capability of specifying address resolution routines.

The DLS 308 can provide an address resolution procedure for input and output using the STREAMS I_STR, or the user can rely on the system default address resolution routines. The IBM AIX operating system provides default address resolution routines that are interface specific.

The DLPI 310 calls the input address resolution routine with a pointer to the MAC header (and optionally to the LLC header) and a pointer to an MBUF structure containing data. The contents of the data depend on which packet format was specified by the user.

The DLPI assigns the destination address to key_2_find and copies the packet format and bind time LLC into a helpers structure. If the user has provided a different DSAP/type, than what was set at bind time, then the DLPI copies those values into helpers. The DLPI then calls the output address resolution routine with a pointer to an output bundle structure, an MBUF structure, and an NDD structure. It is the output resolution routine's responsibility to complete the MAC header and call NDDIoutput.

The following routine is a sample routine to specify the input and/or output address resolution routine.

```
#include < systropts.h >
#include < sys/dlpistats.h >
int fd;
struct strioctl strioctl;
void (*outres)( );
void (*inres)( );
if ((fd = open("/dev/dipi/en",2)) < 0)
        perror("open");
outres = my_output_routine; /*supply your output routine name*/
strioctl.ic_dp = (char *)&outres;
strioctl.ic_cmd = DL_OUTPUT_RESOLVE;
strioctl.ic_timeout = 0;
strioctl.ic_1cn = sizeof(long);
if (ioctl(fd, I_STR,&strioctl) < 0) {
```

-continued

```
    perror("ioctl I_STR failed");
    exit(1);
}
inres = my_input_routine; /*supply your input routine name*/
strioctl.ic_dp = (char *)&inres;
strioctl.ic_cmd = DL_INPUT_RESOLVE;
strioctl.ic_timeout = 0;
strioctl.ic_len = sizeof(long);
if (ioct(fd,I_STR,&strioctl) < 0; {
    perror("ioctl I_STR failed");
    exit(1);
}
```

Figure 4:
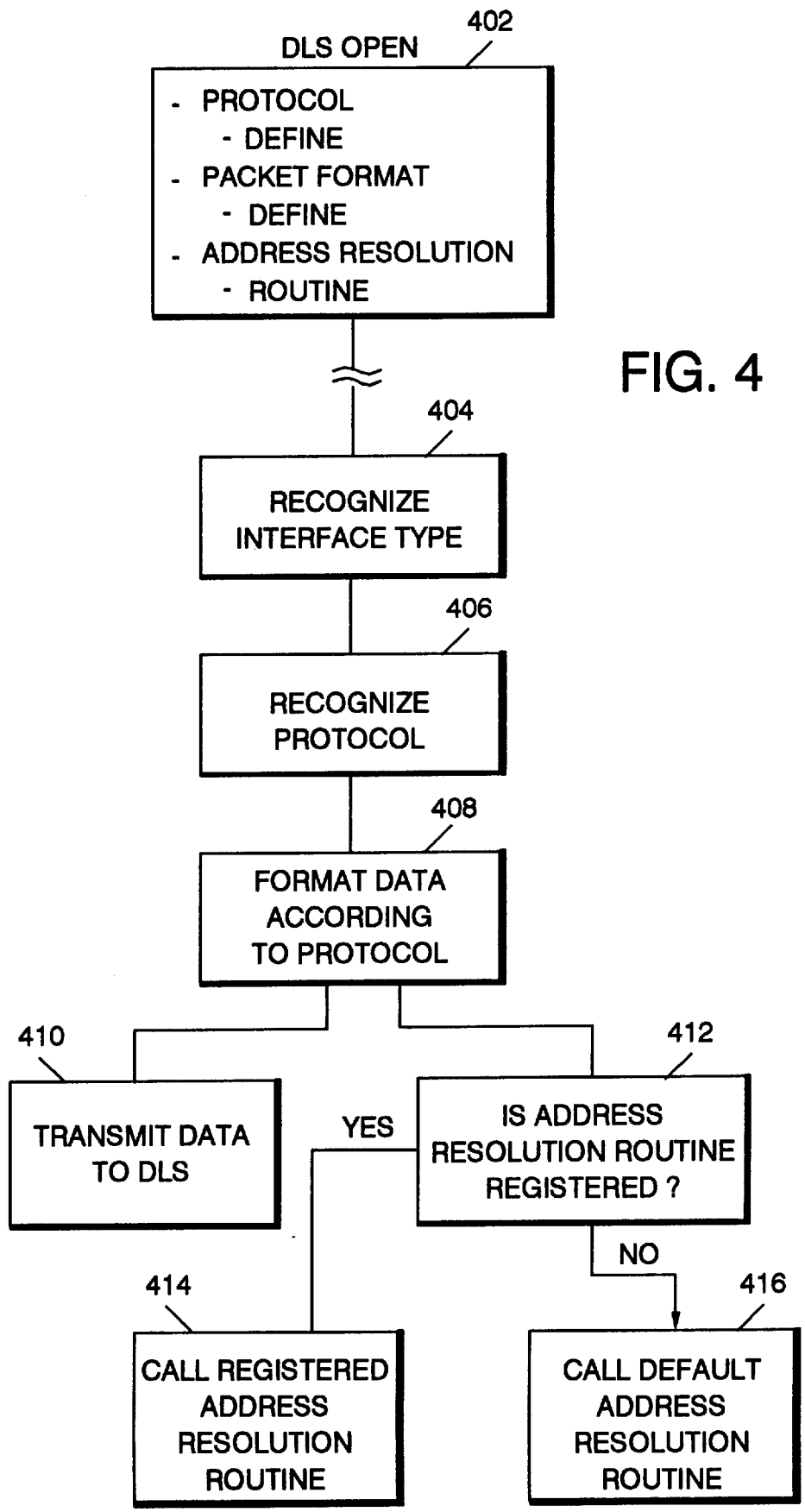
FIG. 4 is a flow diagram of the method of the present invention with respect to receiving data from the network.

Referring now to FIG. 4, the method of the present invention with respect to receiving data from the network will be described.

At DLS Open 402, the user may define a protocol. The DLS 308 then defines a data packet format and register an address resolution routine.

At some later time when data is to be received by station 104, operating system 300 must recognize an interface type at step 404, recognize the protocol of the information to be received at step 406 and format the data according to the recognized protocol at step 408. The data is then transmitted to the DLS 308 step 410, and concurrently, a test is made to determine whether the protocol address resolution is registered in step 412. If the address resolution routine has been registered at the initialization step 402, the registered address resolution routine is called in step 414 and address resolution proceeds accordingly. If the address resolution routine has not been registered, the default address resolution routine specified by the operating system 300 is called in step 416 and address resolution proceeds accordingly.

Figure 5:
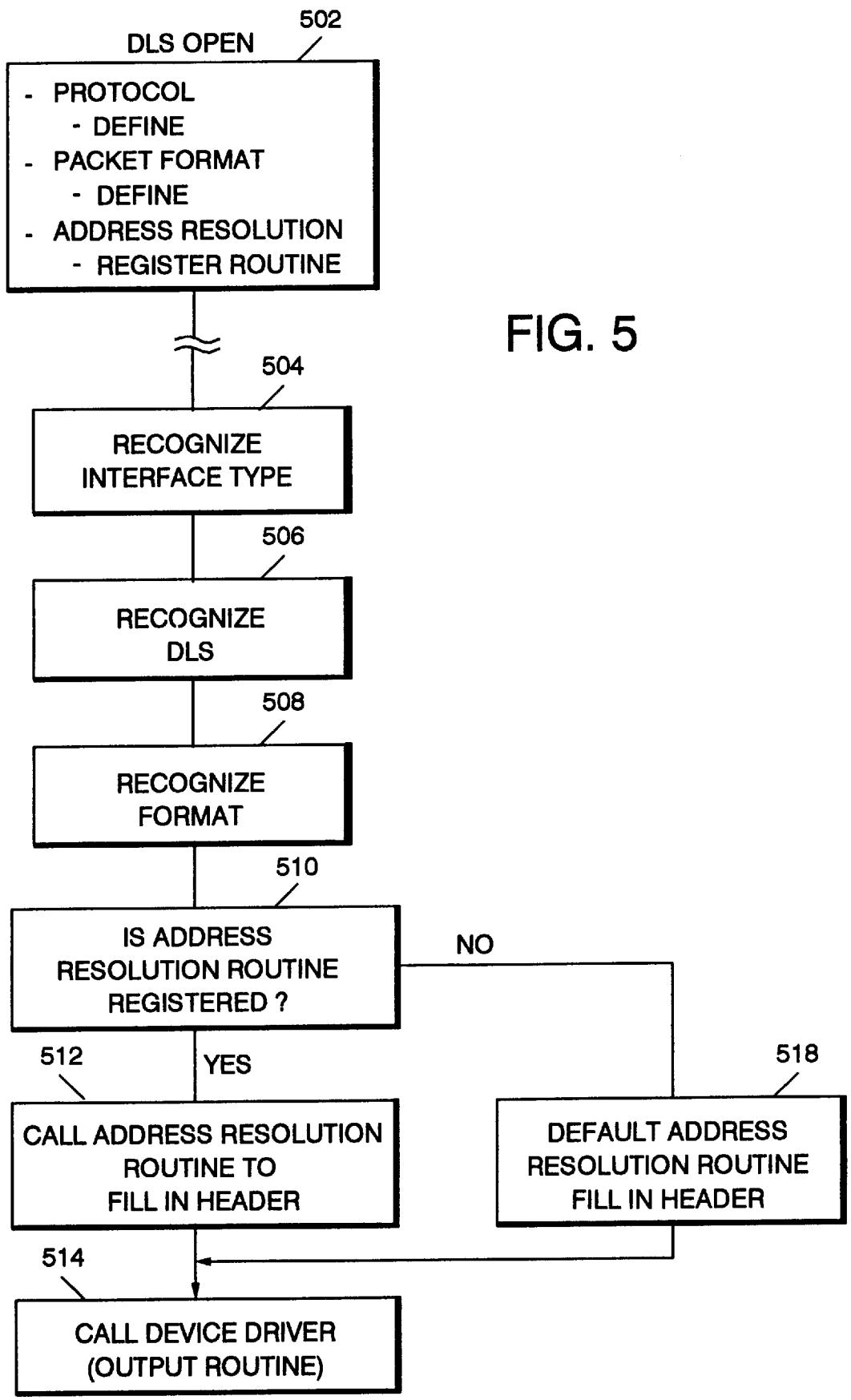
Fig. 5 is a flow diagram of the method of the present invention with respect to transmitting data from a station to the network.

Referring now to FIG. 5, the method according to the present invention with respect to transmitting data from a station 104 to network 102 will be further described.

As described above with respect to FIG. 4, at DLS Open time, a protocol is defined and may be registered. A packet format is defined and an address resolution routine may be registered at step 502. Note that step 402 and step 502 are basically the same.

At some later time, when station 104 is to transmit information to another station 104 across network 102, the following steps must be executed. The interface type must be recognized at step 504 and the DLS 308 must be recognized at step 506. Next, the format must be recognized at step 508. Then a test is made to determine if the address resolution routine is registered at step 510. If the address resolution routine is registered, the address resolution routine is called at step 512 to fill in the header information. Next, the device driver is called at step 514 to output the information to be transmitted to network 102. If the address resolution routine is not registered as indicated in step 510, the default address resolution routine is called at step 518 to fill in header information and then again device driver is called in step 514 as above.

Although the invention has been described with reference to a preferred embodiment thereof, it will be understood by those skilled in the art that various modifications and alterations may be made without departing from the spirit or scope of the invention which is defined in the appended claims.

What is claimed is:

1. An information handling system comprising a plurality of stations connected in a network configuration, each station comprising:

one or more processors, storage means, and input/output control means connected via a bus;

one or more communications adapters connected to said input/output control means, each communications adapter also connected to said network; and an operating system, said operating system comprising:

an application programming interface;

a data link services user;

a data link provider interface;

a device driver interface; and means for registeing an address resolution routine, wherein said address resolution routine comprises means for providing an address resolution procedure which is used by said data link provider interface for resolving hardware and network address conflicts.

2. An information handling system according to claim 1, wherein said address resolution routine further comprises means for defining a packet format for information transfer.

3. An information handling system according to claim 1, wherein each of said stations further comprises:

means for determining if an address resolution routine is registered; and means for calling a default address resolution routine if it is determined that said address resolution routine is not registered.

4. An information handling system according to claim 1, wherein each of said stations further comprises:

means for providing a default packet format if said packet format is not recognized.

5. An information handling system according to claim 1, wherein said data link provider interface comprises:

means for recognizing a network interface type; and means for recognizing a protocol to be used for information transfer between said network and said station.

6. A method for communicating information in an information handling system comprising a plurality of stations connected in a network configuration, each station comprising one or more processors, a storage, input/output control means, and an operating system, said method comprising the steps of:

recognizing an interface type;

recognizing a data format protocol to be used for information transfer between said network and said station;

executing an address resolution routine, wherein said address resolution routine comprises the step of resolving hardware and network address conflicts.

7. A method according to claim 6, wherein said address resolution routine further comprises the step of defining a packet format for information transfer.

8. A method according to claim 6, further comprising the steps of:

determining if an address resolution routine is registered; and calling a default address resolution routine if it is determined that said address resolution routine is not registered.

9. A method according to claim 6, further comprising the step of:

providing a default packet format if said packet format is not recognized.

* * * * *

UNITED STATES PATENT AND TRADEMARK OFFICE
CERTIFICATE OF CORRECTION

PATENT NO. : 5,812,767
DATED : Sept. 22, 1998
INVENTOR(S) : Desai et al

It is certified that error appears in the above-identified patent and that said Letters Patent is hereby corrected as shown below:

Column 3, line 53, please delete "DL_UNITDATAKREQ" and insert --DL_UNITDATA_REQ--;

Signed and Sealed this

Sixteenth Day of March, 1999

Attest:

Q. TODD DICKINSON

Attesting Officer

Acting Commissioner of Patents and Trademarks